(12) United States Patent
Nishikawa et al.

(10) Patent No.: US 6,909,564 B2
(45) Date of Patent: Jun. 21, 2005

(54) MAGNETIC TRANSFER APPARATUS

(75) Inventors: Masakazu Nishikawa, Kanagawa (JP); Kazuhiro Niitsuma, Kanagawa (JP); Akito Kamatani, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 380 days.

(21) Appl. No.: 10/170,186

(22) Filed: Jun. 13, 2002

(65) Prior Publication Data

US 2003/0030927 A1 Feb. 13, 2003

(30) Foreign Application Priority Data

| Jun. 15, 2001 | (JP) | 2001-181933 |
| Jun. 15, 2001 | (JP) | 2001-181936 |
| Jun. 15, 2001 | (JP) | 2001-181943 |
| Jun. 20, 2001 | (JP) | 2001-186800 |
| Jul. 6, 2001 | (JP) | 2001-206462 |
| Jul. 11, 2001 | (JP) | 2001-211022 |
| Sep. 28, 2001 | (JP) | 2001-302230 |

(51) Int. Cl.$^7$ .............................................. G11B 5/86
(52) U.S. Cl. .............................. 360/17; 360/15; 360/16; 428/611; 428/692
(58) Field of Search ................... 360/15–17; 428/611, 428/692, 694 R

(56) References Cited

U.S. PATENT DOCUMENTS 6,839,192 B2 * 1/2005 Kamatani ................... 360/17

FOREIGN PATENT DOCUMENTS

| JP | 2001-155336 | * | 6/2001 |
| JP | 2001-195739 | * | 7/2001 |
| JP | 2002-163823 | * | 6/2002 |

* cited by examiner

Primary Examiner—David Hudspeth
Assistant Examiner—Natalia Figueroa
(74) Attorney, Agent, or Firm—Sughrue Mion, PLLC

(57) ABSTRACT

By bring a master carrier and a slave medium into close contact with uniform force when executing magnetic transfer by applying transfer magnetic field in the state that the master carrier and slave medium is in confronted close contact and received within a holder, inferiority of transfer such as omission of signals is prevented and quality of transfer signals is enhanced.

The magnetic transfer apparatus executes magnetic transfer by applying transfer magnetic field by means of a magnetic field applying apparatus 5 after a master carrier 3, 4 bearing transfer information and a slave medium 2 to be transferred are brought into confronted close contact and received within a holder 10, wherein said holder 10 has a substantially circular shape and in particular, the circularity of holder is not less than 98%, wherein the flexural rigidity= $Ed^3/12$ determined by Young's modulus E and thickness d of the holder is in the range of 0.1~30 kN·m$^2$ when the width of close contact area between the slave medium and master carrier is defined as 1m, and wherein the practical thickness of the holder is not less than 3 mm and not more than 15 mm.

2 Claims, 3 Drawing Sheets

MAGNETIC TRANSFER APPARATUS

TECHNICAL FIELD

The present invention relates to a magnetic transfer apparatus for executing magnetic transfer from a master carrier bearing information to a slave medium.

BACKGROUND OF THE INVENTION

In general, as amount of information is increased, a magnetic recording medium is demanded which is of mass storage to record a large quantity of information as well as low-priced, and preferably enables so-called high speed access that can read out necessary part within a short time. As an example of such a medium, a high-recording density flexible disc is known, and so-called tracking servo technique, in which a magnetic head accurately scans a narrow track width and generates signals with a high S/N ratio, is playing an important role for realizing such mass storage. In one revolution of disc, a servo tracking signal, an address information signal, a regenerative clock signal and the like are recorded in a predetermined space in so-called pre-format.

The magnetic head is allowed to accurately run over the tracks by reading these pre-format signals and correcting its own position. Recently, the pre-format is formed by recording discs one by one or tracks thereof one by one using an exclusive servo writer.

However, because such a servo writer is very expensive and the formation of pre-format is time-consuming, this process occupies a large part of manufacturing cost and it is desired to reduce cost of process.

Meanwhile, it has been proposed to realize the mass storage by a magnetic transfer method, not by recording tracks one by one in pre-format. For example, such a magnetic transfer method is disclosed in Japanese Unexamined Patent Publication Nos. sho63-183623, hei10-40544, hei10-269566, etc. The magnetic transfer executes transfer of a magnetized pattern corresponding to information (for example, a servo signal) born in a master carrier by applying magnetic field for transfer in the state that the master carrier and slave medium are in close contact with each other, wherein recording can be executed statically without changing the relative position between the master carrier and the slave medium, whereby it is possible to execute accurate pre-format recording and the time needed for the recording is very short.

In order to improve the quality of transfer in said magnetic transfer, it is an important task how to bring the master carrier and slave medium into close contact by uniform force or without any gap. That is, there will be problems in that if the close contact is not assured a region which does not undergo magnetic transfer may be generated, if magnetic transfer is not generated, omission of signals may be caused in the magnetic information transferred onto the slave medium, thereby deteriorating the quality of signal, and if the recorded signals are the servo signals, a satisfactory tracking function can not be obtained and reliability will be lowered.

As a measurement for solving this problem, the inventors have proposed in Japanese Patent Application No. 2001-144296, etc. to provide an adsorption member having a flat surface (holder surface) for adsorbing and holding the rear surface of said master carrier and to bring the master carrier into close contact with the slave medium in the state that the flatness of said master carrier has been enhanced.

This method is described with reference to FIGS. 1 and 2. FIG. 1 is a perspective view of main parts showing the transfer state of a magnetic transfer apparatus according to an embodiment of the present invention. FIG. 2 is an exploded perspective view of a holder.

The magnetic transfer apparatus 1 shown in FIGS. 1 and 2 executes simultaneous transfer of both sides by inplane recording technique, in which magnetic field for transfer is applied by magnetic field applying apparatus 5 (electromagnetic devices) located upper and lower sides of a holder 10 which brought master carriers 3 and 4 into confronted close contact with top and bottom sides of a slave medium while rotating the holder 10, so that information born in the master carrier can be magnetically transferred and recorded onto both sides of slave medium 2 at the same time. Herein, the expression "confronted close contact" indicates either close contact state or facing state with a very small gap.

The holder 10 comprises a lower side master carrier 3 for transferring information such as a servo signal onto the lower recording surface of slave medium 2, an upper side master carrier 4 for transferring information such as a servo signal onto the upper recording surface of slave medium 2, a lower side press-contact member (lower side holder) 8 provided with a lower side adsorption member 6 for adsorbing and holding said lower side master medium 3 to correct the flatness thereof, and an upper side press-contact member (upper side holder) 9 provided with an upper side adsorption member 7 (which has a construction same with the lower side adsorption member 6) for adsorbing and holding said lower side master medium 3 to correct the flatness thereof, wherein the master carriers and press-contact members are compressively contacted in the centered state, thereby bringing the lower side master carrier 3 and lower side master carrier 4 into confronted close contact with both surfaces of the slave medium 2.

The slave medium 2 shown in the drawing is a flexible disc consisting of a disc-shaped recording medium 2a with a hub 2b fixed on its center part, wherein the recording medium 2a has recording surfaces formed with magnetic layers on the both surfaces of a disc-shaped base which is formed from a flexible polyethylene terephthalate and the like. This slave medium may be a hard disc.

Said lower side master carrier 3 and upper side master carrier 4 are formed as a disc of circular shape, wherein each of the master carriers have a transfer information-bearing surface formed by a fine uneven pattern on the one surface and is adsorbed by vacuum and held on the lower side adsorption member 6 or upper side adsorption member 7 on the other surface. In order to increase the close contact capability as desired, the lower side master carrier 3 and upper side carrier 4 are provided with fine holes formed through the front and rear surfaces thereof in a position, where the uneven pattern is not formed and where they do not communicate with the adsorption holes in the adsorption members 6 and 7 to be described, to inhale and discharge air from the interface between the closely contacted surfaces.

The lower side adsorption member 6 (and likewise the upper side adsorption member 7) is formed in a disc shape having a size corresponding to that of the master carrier 3, and its surface is formed as an adsorption surface 6a smoothly finished in a planeness having centerline mean roughness Ra in the range of about 0.1~1.0 μm.

In the adsorption surface 6a, about 25~100 suction holes are substantially evenly opened, diameters of which do not exceed about 2 mm. Although not shown, these holes are connected to and sucked by a vacuum pump via a adsorption passage way extended from the inside of lower side adsorption member 6 to the outside of lower side press-contact member 8, and vacuum adsorbs the rear surface of master carrier 3 closely contacted onto the adsorption surface 6a to correct the flatness of master carrier 3 to conform to the adsorption surface 6a.

The lower side press-contact member 8 and upper side press-contact member 9 are disc-shaped and one or both of them is set to be axially movable and performs opening/closing action by an opening/closing mechanism not shown (pressing mechanism, locking mechanism and the like) to be press-contacted with each other in a predetermined pressure. They have flange parts 8a and 9a at the outer circumferences, so that at the time of closing action, the flange parts 8a and 9a will contacts with each other, thereby maintaining the internal parts in the close contact state. The center of lower side press-contact member 8 is provided with a pin 8b for engaging with the center hole of hub 2b of slave member 2 to perform positioning. In addition, the lower side press-contact member 8 and upper side press-contact member 9 are connected to a rotary mechanism (not shown) and rotatably driven in unison.

Said holder 10 executes magnetic transfer for a plurality of slave mediums 2 by the same lower side master carrier 3 and upper side master carrier 4, wherein firstly the lower side master carrier 3 and upper side master carrier 4 are centered on the adsorption surfaces 6a of lower side adsorption member 6 and upper side adsorption member 7, and then respectively maintained thereon by being adsorbed by vacuum.

And, the slave medium 2, which has previously undergone initial magnetization, is centered and set in the opened state where the upper side press-contact member 9 and lower side press-contact member 8 are separated, and then closing operation is performed by approaching the upper side press-contact member 9 and lower side press-contact member 8 to bring the master carriers 3 and 4 into close contact onto both surfaces of slave medium 2. Thereafter, the magnetic field applying apparatus 5 are approached to upper and lower surfaces of holder 10 by moving the upper and lower magnetic field applying apparatus 5 or the holder 10, and the transfer information of lower side master carrier 3 and upper side master carrier 4 is magnetically transferred and recorded onto the recording surfaces of slave medium 2 by applying transfer magnetic field by means of the magnetic field applying apparatus 5 while the holder 10 is being rotated.

In the case of inplane recording, the magnetic field applying apparatus 5 for applying initial magnetic field and transfer magnetic field comprises ring-shaped head electromagnets located upper and lower sides of the slave medium 2, wherein each of the head electromagnets comprises a core having a gap extended, for example, in the radial direction of slave medium 2 and a coil wound around the core, and the magnetic field applying apparatus applies transfer magnetic field generated in the same direction parallel to the track direction from the upper and lower sides. It is possible to arrange the magnetic field applying apparatus 5 only in the one side of the slave medium and it is possible to provide permanent magnetic devices either in the both sides or in the one side of the slave medium. Furthermore, it is possible to rotationally move the magnetic field applying apparatus 5.

In the case of perpendicular recording, electromagnets or permanent magnets having different poles are located in the upper and lower sides of the holder 10 of slave medium 2 and master carrier 3 and magnet field is generated and applied in the vertical direction. When partially applying magnetic field, the magnetic transfer is executed over the entire surface by moving the holder 10 of slave medium 2 and master carrier 3 or the magnetic field.

According to the above aspect, the master carriers 3 and 4 are adsorbed by vacuum onto the adsorption surfaces of adsorption members 6 and 7 of high flatness, respectively, when the master carriers 3 and 4 are brought into close contact with the both surfaces of slave medium 2, whereby it is possible to correct and enhance the flatness of the master carriers. Because the slave medium 2 is compressively contacted and brought into close contact with the upper and lower side flat master carriers 3 and 4 as if it is sandwiched between them, it is possible to bring the slave medium 2 and the master carriers 3 and 4 into close contact with each other evenly all over the entire surfaces without producing any gap between them and to transfer and record magnetized patterns accurately corresponding to the uneven pattern formed in the master carriers 3 and 4 onto the recording surfaces of slave medium 2. Furthermore, because the master carriers 3 and 4 are corrected to be flat prior to being in close contact with the slave medium 2, the master carriers 3 and 4 will not be deformed, no friction will be produced between the slave medium 2 and the master carriers, whereby no damage will be caused and endurance and quality can be enhanced.

However, in the above process, because the slave medium 2 is compressively contacted and brought into close contact with the upper and lower flat master carriers 3 and 4 as if it is sandwiched between them as described in the above, the compression by the holder for retaining the master carriers should be executed evenly.

Therefore, the inventors made a number of holders for getting master carriers and slave medium into close contact and performed magnetic transfer, and as a result, local omission of signals from the transferred signals and deterioration of signal quality were found in some cases. Because it was considered that there was a problem in this close contacting method, the inventors analyzed the shapes and elastic characteristics of the holders. Heretofore, as a method for applying close contact force, the vacuum method (Japanese Unexamined Patent Publication No. sho64-88921) and the like have been proposed.

As can be seen from the experimental examples to be described below in detail, when the vacuum method was used as a method for applying close contact force, although force was uniformly applied all over the holder and thus the force of holder was balanced in the region where the master carriers and slave medium were arranged, it was found that deformation of the holder is generated in the region where the master carriers and the slave medium are not arranged to the extent that the force is to be balanced. In addition, it was found that force was concentrated on the closely contacted disc edge of the master carriers and the slave medium and the close contact force was reduced between the central parts thereof, and thus spacing between the master carrier and the slave medium was increased and inferiority of signal transfer was generated.

The present invention is conceived in consideration of the aforementioned problems in mind. The object of the present invention is to provide a magnetic transfer apparatus which can prevent inferiority of transfer, such as omission of signals, and enhance the quality of transferred signals by bringing the master carrier and slave medium into close contact with each other with uniform force when transfer magnetic field is applied to execute magnetic transfer in the state that a master carrier and a slave medium are brought into confronted close contact and received in a holder.

In addition, in the aforementioned means, said holder 10 was applied with transfer magnetic field by the magnetic field applying apparatus 5. Therefore, there was a problem in that not only the transfer information in the lower side master carrier 3 and upper side master carrier 4 was magnetically transferred and recorded onto the recording surfaces of slave medium 2, but also the holder 10 itself was magnetized depending on its material. If said holder 10 is magnetized, there were some cases in which magnetic field for transfer was inhaled into the holder, effective magnetic field for transfer was deficient, and signal quality was deteriorated.

Driving means for rotating the holder 10 is essential in the aforementioned means. However, as shown in FIG. 1, it was difficult to secure a space for installing the driving means for rotating said holder 10, due to the magnetic field applying apparatus 5, a suction passage to a vacuum pump which is not shown and the like. Furthermore, even if it was possible to secure such a space for installation, the periphery of apparatus became structurally complicated, and problems were arisen in view of maintenance, workability and the like when the aforementioned means was adopted as a general mass production apparatus, although it may be adopted as an experimental apparatus or not.

Furthermore, because magnetic field for transfer was applied to said holder 10 by the magnetic field applying apparatus 5 in the aforementioned means, there were some problems in that depending on the material of this holder 10, it was impossible to obtain sufficient magnetic field intensity, and occasionally the quality of signal for the transfer information of upper and lower master carriers 3 and 4 to be magnetically transferred and recorded onto the recording surface of slave medium 2 was not reached to a required level.

In magnetic transfer, magnetostatic field is applied when signals are recorded in the slave medium. In order to enhance the processing efficiency of magnetic transfer, it is effective to shorten the processing time by increasing magnetic field applying sweep velocity. However, when the processing time was shortened, there were some cases that the quality of signals recorded in the slave medium after transfer was not reached to a level obtained when the magnetic transfer was executed in a normal sweep velocity. After analyzing these phenomena, it was found that if the processing time is shortened, the transfer magnetic field increasing time becomes abrupt, and thus demagnetizing field is generated in the holder formed from a material of low electric resistance and it is impossible to obtain sufficient magnetic field intensity in the closely contacted surfaces of master carrier and slave medium.

The present invention is conceived in consideration of the aforementioned problems. The object of the present invention is to secure the signal quality of transfer signal by defining the specific electric resistance or/and the relative magnetic permeability of holder for retaining the master carrier and the slave medium and applying transfer magnetic field to execute magnetic transfer.

In the aforementioned magnetic transfer apparatus, the inventors also reviewed to accomplish close contact between the master carriers and slave medium by enhancing planeness and flatness of adsorption surfaces of holders in the area that they were contacted with the rear surfaces of master carriers in the upper and lower holders, causing the master carriers to be adsorbed on the basis of those surfaces, and enhancing the flatness of master carriers themselves.

However, when the adsorption surface was formed in high planeness and flatness, there was a problem in that air remained between the adsorption surface and the rear surface of master carriers without being discharged is accumulated and local deformation is generated in the master carriers. In particular, if the number of adsorption holes in the adsorptions surfaces was small or such holes were not formed, said air accumulation is easily produced.

In addition, even if the air accumulation was not generated, there was a problem in that the master carriers are adsorbed onto the adsorption surfaces with the close contact between flat surfaces and the removal of master carriers from the adsorption surfaces for cleaning, exchanging and the like causes deformation of master carriers.

The present invention is conceived in consideration of the aforementioned problems. The object of the present invention is to provide a magnetic transfer apparatus adapted to enhance the quality of transfer signals, in such a way that the flatness of master carriers is made to secure prevention of air accumulation and easiness of removal, thereby improving close contact capability between the slave medium and master carriers.

SUMMARY OF THE INVENTION

According to one aspect of the present invention, there is provided a magnetic transfer apparatus for executing magnetic transfer by applying transfer magnetic field after a master carrier bearing transfer information and a slave medium to be transferred are brought into confronted close contact and received within a holder, characterized in that said holder has a substantially circular shape and in particular, the circularity of holder is not less than 98%, in that the flexural rigidity=$Ed^3/12$ determined by Young's modulus E and thickness d of the holder is in the range of 0.1~30 kN·m² when the width of close contact area between the slave medium and master carrier is defined as 1 m, and in that the practical thickness of the holder is not less than 3 mm and not more than 40 mm.

As apparent from the aforementioned analysis of close contact mode, because local and symmetrical omission of signals was generated in connection with the shape of holder, a shape for uniformly applying force was needed, and by designing the holder in the circular shape, the local and symmetrical omission of signals was not occurred. By setting the circularity of holder to 98% or more, the omission of signals was more largely reduced. In order to reduce the omission of signals further more, it is required to enhance the mechanical strength of magnetic field of holder, and in order to enhance the mechanical strength it is important to use a material with a high Young's modulus E and to increase the thickness d of structure. Herein, as a result of evaluation of signal omission using material and thickness as parameters, when the thickness of holder was set below 3 mm, the deformation was increased and it was difficult to obtain a uniform close contact between the closely contacted surfaces of master carrier and slave medium.

Generally, it is believed that the more the rigidity is increased, the more deformation will be decreased, omission of signals will be reduced and the quality of signals will be enhanced. However, it was found that if the thickness of holder is designed to exceed 15 mm, the quality of signals is degraded although omission of signal is not substantially occurred. As a result of an analysis performed using thickness of holder as a parameter, it has been found that depending on the thickness of holder, distribution of magnetic field applied from the magnetic field applying apparatus (electromagnets) to the holder is increased and magnetic transfer level is decreased. Accordingly, it was possible to achieve uniformity in close contact and magnetic field distribution by setting the holder thickness to be not less than 3 mm and not more than 15 mm.

Also, values obtained by measuring with vibration lead technique are used as said Young's modulus. A sample of strap shape with a length L of 50 mm and a thickness d is cut from a raw material of holder and anchored at one end thereof. Vibration is applied to the sample and resonance frequency f is measured in the state that the one end is anchored. It is known that Young's modulus has a relationship with resonance frequency f as follows:

$$E=3\rho f^2 (4\pi L^2/\alpha d)^2$$

The Young modulus is calculated from the above equation, wherein ρ is density and α is a constant (1.875). By substitution of Young's modulus E, width of sample b, thickness of sample d for the equation of flexural rigidity= Ebd³/12, the value of flexural rigidity is obtained. The present invention determines the optimum range of flexural rigidity obtained at the time when the width of sample is defined as 1 m.

According to another aspect of the present invention, there is provided a magnetic transfer apparatus for executing magnetic transfer by applying transfer magnetic field after a master carrier bearing transfer information and a slave medium to be transferred are brought into confronted close contact and received within a holder, characterized in that the relative magnetic permeability of material of said holder is not more than 10, preferably not more than 5.

In this case, the material of holder is not limited specifically if it has such characteristic and can be properly selected from metal, plastic, ceramic and the like. However, if it is considered in view of industrial scale, aluminum alloy, stainless alloy and the like are suitable.

According to another aspect of the present invention, there is provided a magnetic transfer apparatus for executing magnetic transfer by applying transfer magnetic field after a master carrier bearing transfer information and a slave medium to be transferred are brought into confronted close contact and received within a holder, characterized in that the surface of said holder is treated with surface hardening treatment.

Such a surface hardening treatment can solve the problems that a part of surface of said holder forms granular detached materials or generates abraded powders, thereby causing dusts. In this case, such a holder is generally formed from aluminum or stainless alloy, which is a non-magnetic material. Therefore, if the holder is formed from aluminum, alumite treatment and the like are preferred as the surface hardening treatment. If the holder is formed from stainless, hard chromium plating treatment, tufftriding treatment, high-frequency induction hardening and the like are preferred. Furthermore, it may be preferable to deposit DLC (diamond-like carbon) film on the surface. The treatment condition may be properly selected in accordance with the circumstance for using the holder (condition of external pressure and the like).

According to another aspect of the present invention, there is provided a magnetic transfer apparatus for executing magnetic transfer by applying transfer magnetic field after a master carrier bearing transfer information and a slave medium to be transferred are brought into confronted close contact and received within a holder, characterized in that said holder is rotated by means of a rotary means which is in sliding-contact with the outer circumference of the holder.

In this case, employed as said rotary means is a disc-shaped one. If said holder has a disc shape, the holder and the rotary means rotate with slide contact, and if said holder has a rectangular shape, it is preferred to form a part of the holder into a disc shape so that it can be rotated by slide contact with the rotary means. In the parts of said slide contact, meshing structure of gears or frictional contact structure of elastic members such as rubber is employed. In addition, in the diametric direction of 180° of said rotary means, it is preferable to provide supporting means for counterbalancing the force in a thrust direction. Also, it is preferred to position the supporting means on two points angularly spaced by 120° to the left and right when shown from said rotary means.

According to another aspect of the present invention, there is provided a magnetic transfer apparatus for executing magnetic transfer by applying transfer magnetic field after a master carrier bearing transfer information and a slave medium to be transferred are brought into confronted close contact and received within a holder, characterized in that the specific electric resistance of material of said holder is not less than 2.0×10⁻⁸ Ω·m and not more than 20×10⁻⁸ Ω·m.

For example, in the embodiment shown in FIGS. 1 and 2, the electric resistances of lower side press-contact member 8 and upper side press-contact member 9 including the lower side adsorption member 6 and upper side adsorption member 7 in the holder 10 are established in the above range. In this case, the material of holder is not specially limited if it has the above characteristic and can be properly selected from various materials. However, if it is considered in view of an industrial scale, aluminum alloy, stainless alloy and the like are preferred.

According to another aspect of the present invention, there is provided a magnetic transfer apparatus for executing magnetic transfer by applying transfer magnetic field after a master carrier bearing transfer information and a slave medium to be transferred are brought into confronted close contact and received within a holder, characterized in that the adsorption surface of said holder in the area where the rear surface contacts to the holder has a centerline mean roughness Ra not less than 0.1 $\mu$m and not more than 1 $\mu$m, the range of fluctuation of tip ends of fine prominences in the surface is not more than 0.01 $\mu$m and the flatness is not more than 1 $\mu$m.

FIG. 4 is a cross-sectional schematic view of the adsorption surface 6a. On the surface, fine unevenness is formed in such a manner that the centerline mean surface roughness Ra corresponding to the height of fine prominences a on the surface of unevenness will be 0.1~1 $\mu$m, the range of fluctuation of tip ends of the fine prominences of surface, b will be not more than 0.01 1 $\mu$m, and flatness of quasi-surface, i.e., the difference between the highest position and the lowest position c will be not more than 1 $\mu$m.

Formation of such an adsorption surface is accomplished by performing surface-roughening treatment on a surface, which was formed to have a flatness not more than 1 $\mu$m, by knurling or blasting treatment, so that the mean surface roughness Ra will be 0.1~1 $\mu$m and the range of fluctuation of tip ends of fine prominences on the surface will be not more than 0.01 $\mu$m.

In addition, said upper side press-contact member and lower side contact member may be constructed as an adsorption surface construction exhibiting weak adsorption force or a flat surface which does not have any adsorption holes, besides they are constructed as a holder surface by the adsorption surface of adsorption member having a correction function as shown in FIG. 2 described in the above. It is preferable if at least the area to which the rear surface of master carrier contacts is formed to have surface characteristics as explained in the above.

According to the magnetic transfer apparatus of the present invention, the holder for realizing the close contact state between the master carrier and slave medium is substantially circular, the flexural rigidity of holder=$Ed^3/12$, defined by Young's modulus of material E and thickness of holder d, is in the range of 0.1~30 kN·m$^2$ and the practical thickness of holder is 3~15 mm, whereby it is possible to bring the master carrier and slave medium into close contact with uniform force, thereby avoiding defective close contact, preventing generation of transfer inferiority such as signal omission and the like, and enhancing the quality of transfer signals.

Furthermore, according to the present invention, when the relative magnetic permeability of material of holder of the magnetic transfer apparatus was not more than 10, the holder itself does not magnetized by the magnetic field for transfer at the time of magnetic transfer and it is possible to obtain desired transfer magnetic field and to obtain good quality of transfer.

According to another aspect of the present invention, when the holder of magnetic transfer apparatus is made to be rotated by a rotary means which is in slide contact with the outer circumference of holder, the space for installing driving means can be designed without considering a magnetic field applying apparatus, a suction passage to a vacuum pump and the like and it is possible to solve the problems in the standpoint of maintenance, workability and the like as a general production installation.

According to another aspect of the present invention, when the specific electric resistance of holder material of magnetic transfer apparatus is adjusted to $2.0 \times 10^{-8}$ $\Omega$·m or more, it is possible to greatly suppress the generation of demagnetizing field, to obtain a magnetic field intensity required for magnetic transfer, and to enhance the treatment efficiency by reducing the process time, even if the transfer magnetic field increasing time becomes abrupt. In addition, although there is a problem in that the holder itself is electrically charged and dusts were attached thereon, whereby signal omission and the like were generated if the specific electric resistance was so high, it is also possible to solve the problem of electrical charge by setting the specific electric resistance of holder material to be not more than $20 \times 10^{-8}$ $\Omega$·m.

According to another aspect of the present invention, the improvement in air accumulation and separability of master carrier become compatible if the mean centerline surface roughness of holder surface Ra is not less than 0.1 $\mu$m and not more than 1 $\mu$m, the range of fluctuation of tip ends of fine prominences on the surface is not more than 0.01 $\mu$m, and the flatness is not more than 1 $\mu$m, in the area where the rear surface of master carrier contacts with the holder surface.

That is, if the holder surface is formed with high precision of flatness not more than 1 $\mu$m and fluctuation range of tip ends of fine prominences not more than 0.01 $\mu$m the flatness of master carrier can be secured and its close contact capability with the slave medium can be enhanced, thereby preventing the generation of signal omission. Furthermore, by forming the surface somewhat roughly to have centerline mean surface roughness Ra in the range of 0.1~1 $\mu$m, the inflow and discharge of air will be promoted by the space formed by unevenness of the surface, thereby preventing the air accumulation caused by air remained in the state of close contact with the master carrier and allowing easy separation after the close contact. If the centerline mean surface roughness is below 0.1 $\mu$m, problems will be arisen in connection with air accumulation and separability, and if the centerline mean surface roughness exceeds 1 $\mu$m, local deformation of master carrier will be generated and cause defectiveness of close contact because the surface is too rough.

BRIEF DESCRIPTION OF THE DRAWINGS

The embodiments of the present invention will be explained with reference to the accompanying drawings, in which.

DETAILED DESCRIPTION OF THE INVENTION

Figure 3:
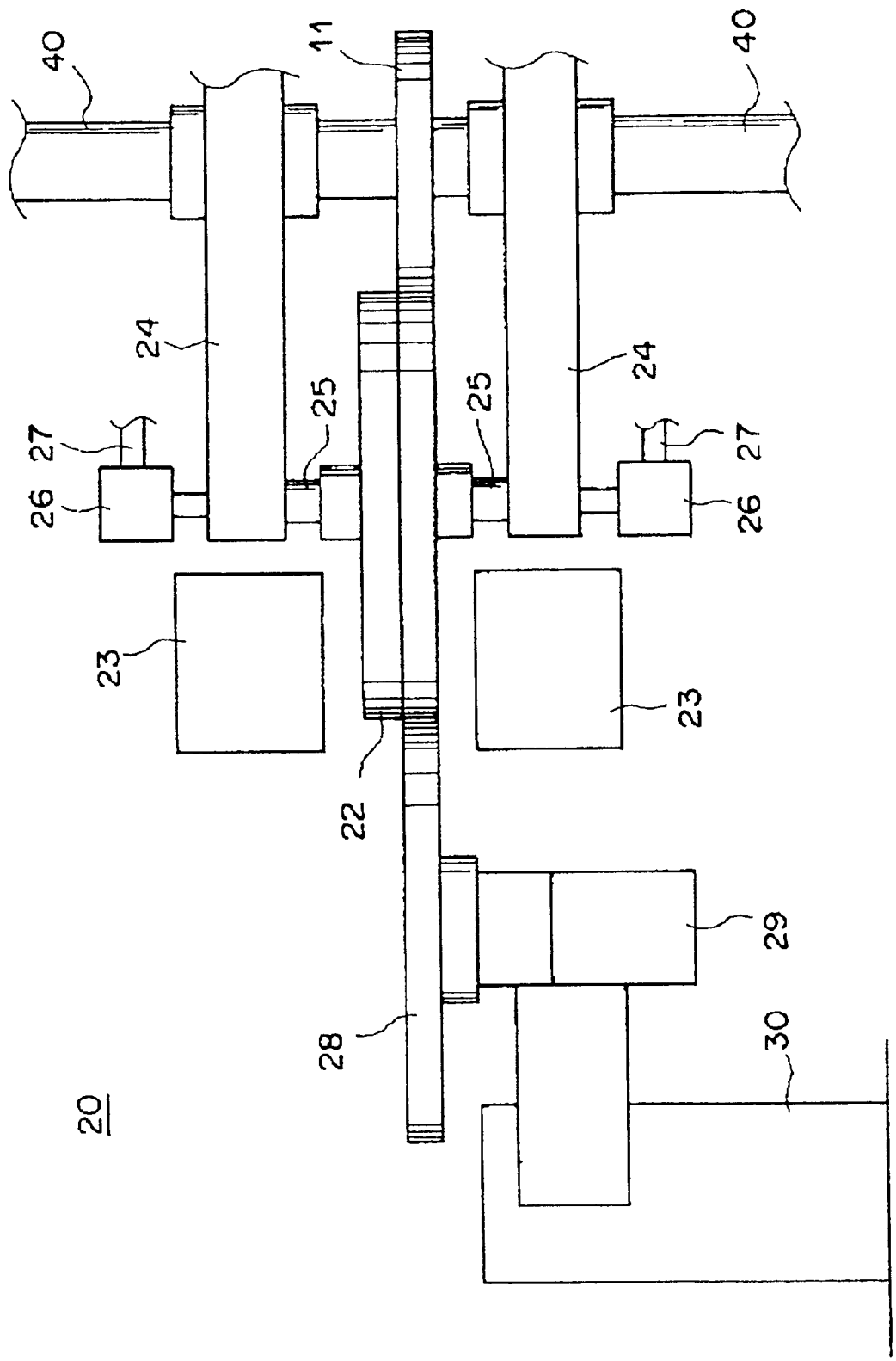
FIG. 3 is a plan view of main parts showing the state of transfer of magnetic transfer apparatus according to an embodiment of the present invention.
Figure 4:
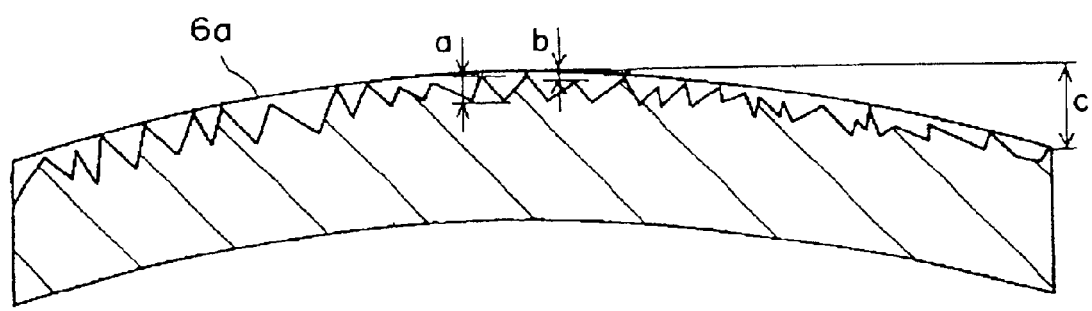
FIG. 4 is a schematic cross-sectional view of holder surface of magnetic transfer apparatus according to another embodiment.

Herein below, an embodiment of the present invention will be described in detail. FIG. 3 is a front view of main parts showing transfer state of magnetic transfer apparatus according to an embodiment of the present invention. The members installed within the holder such as the master carrier, slave medium and the like are described in detail in the above and the description thereof will be omitted.

Figure 1:
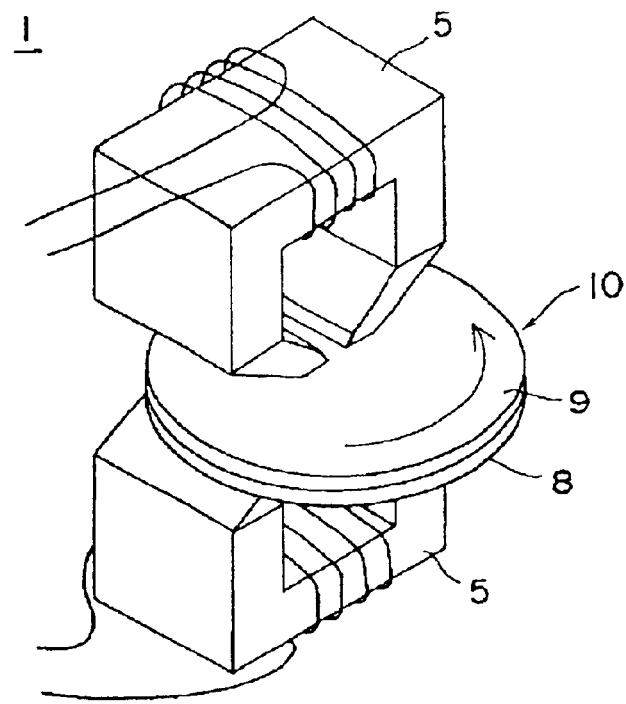
FIG. 1 is a perspective view of main parts showing the state of transfer of magnetic transfer apparatus according to the present invention.
Figure 2:
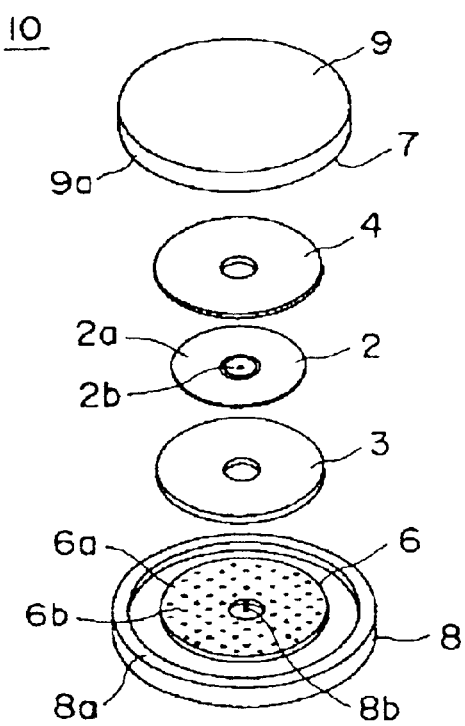
FIG. 2 is an exploded perspective view of a holder shown in FIG. 1.

The magnetic transfer apparatus 20 shown in FIG. 3 executes simultaneous both side transfer by inplane recording technique, in which magnetic field for transfer is applied by a magnetic field applying apparatus 23 (electromagnetic devices) located upper and lower sides of a holder 22 (identical to the holder 10 shown in FIG. 1) while rotating the holder 22 which has brought master carriers into confronted close contact with upper and lower sides of a slave medium, whereby information born in the master carrier is magnetically transferred and recorded onto both sides of slave medium 2 at the same time.

The holder 22 is separated into upper and lower parts, which are integrally supported on the lower and upper ends of upper side and lower side driving members 25, 25, the driving members being rotatably supported on the tip ends of upper side and lower side supporting arms 24, 24 which are slidable in the upper and lower directions of the drawing, respectively. The upper side and lower side supporting arms 24, 24 are maintained on a guide rod 40 extended in the upper and lower directions to be slidable in the upper and lower directions.

In addition, a vacuum suction passage is formed within the driving members 25, 25 and connected to vacuum pump suction passages 27, 27 through rotary joints 26, 26.

Herein, the holder 22 is in slide contact with a rotary means 28 of disc shape on its outer circumference, and said rotary means 28 is connected to a reduction gear integrated driving motor 29 and retained by a separate support 30.

Herein, when magnetic transfer treatment is performed, the holder 22 is rotated in such a manner that the rotary means 28 rotates and the holder 22 is connected to and rotated by the rotary means.

A supporting member 11, which is also disc-shaped, is rotatably mounted on said guide rod 40 diametrically to the rotary means 28 for counterbalancing thrust force, thereby preserving stabilization of rotation of said holder 22.

Although the details of said slide contact portions are not shown, a method for mounting gears on opposite sides of the holder 22 and rotary means 28 to use meshing therebetween, a method for contacting elastic bodies such as rubber, and the like may be properly selected.

Method of Test

Herein, Examples and Comparative examples of holders of magnetic transfer apparatus are illustrated, wherein the result of test will be explained which was obtained using various shapes, sizes, materials and the like thereof included within the aforementioned ranges. The master carriers and slave medium used in the test and method for evaluating them are as follows.

Master Carrier

In the test, a master carrier having a transfer pattern was used, wherein the transfer pattern has a pit length of 0.3 $\mu$m, a track width of 2.5 $\mu$m interval, a track pitch 2.6 $\mu$m and a groove depth of 0.2 $\mu$m in the area of 20–40 mm from the center in a radial direction. In manufacturing the master carrier, a stamper producing method was used. On a Ni substrate, a magnetic layer (FeCo 30 at % layer) was formed at substrate temperature of 25° C. Ar sputtering pressure was $1.5\times10^{-1}$ Pa (1.08 mTorr). Input power was 2.80 W/cm$^2$.

Slave Medium

In the vacuum film sputtering apparatus (S-50S sputtering apparatus manufactured by Shibaura Mechatronics Company), under condition that pressure was decreased to $1.33\times10^{-5}$ Pa($10^{-7}$ Torr) at room temperature and then argon gas was introduced to be 0.4 Pa($3\times10^{-3}$ Torr), a glass disk was heated to 200° C. to prepare a magnetic recording medium (hard disc) having a disc shape of 3.5 inch type in which CrTi was 60 nm thick, CoCrPt was 25 nm thick, the magnetic flux density Ms was 5.7T (4500 Gauss) and the coercive force Hcs was 199 kA/M (2500 Oe).

Holder

In Example 1, a holder was used which is formed from duralumin and circular-shaped, wherein its circularity was 99% and its thickness was 5 mm. The flexural rigidity is indicated in Table 1, and the flexural rigidity can be adjusted by changing material to be used. In particular, it is possible to use duralumin, magnesium alloy, stainless alloy and the like.

Examples 2 and 3 are identical to Example 1 except that the holder thickness of Example 2 was set to 3 mm and the holder thickness of Example 3 is set to 38 mm. Comparative Examples 1 and 2 are identical to Example 1 except that the holder thickness of Comparative Example 1 is set to 2 mm and the holder thickness of Comparative Example 2 is set to 45 mm. Comparative Example 3 is identical to Example 1 except that shape of holder is changed to quadrilateral. Comparative Example 4 is identical to Example 1 except that the circularity of holder is set to 96%. Comparative Example 5 is identical to Example 1 except that the material of holder is changed to pure cupper.

Relative Magnetic Permeability

In Example 4, a holder identical to that of Example 1 was used, which is formed from duralumin, and has circularity of 99% and thickness of 5 mm. The relative magnetic permeability thereof was 0.8.

Example 5 is identical to Example 4 except that the material of the holder was stainless 304 (relative magnetic permeability 2.0).

Example 6 is identical to Example 4 except that the material of the holder was stainless 316 (relative magnetic permeability 8.0).

Comparative Example 5 is identical to Example 4 except that the material of the holder was stainless 430 (relative magnetic permeability 15)

Comparative Example 6 is identical to Example 4 except that the material of the holder was stainless 440 (relative magnetic permeability 30)

Specific Electric Resistance

In Example 7, a holder identical to that of Example 1 was used, which is formed from duralumin, and has circularity of 99% and thickness of 5 mm. The specific electric resistance thereof was $3.4 \times 10^{-8}$ Ω·m.

Example 8 is identical to Example 4 except that the material of the holder was chrome (specific electric resistance is $18 \times 10^8$ Ω·m).

Comparative Example 7 is identical to Example 4 except that the material of the holder was cupper (specific electric resistance is $1.7 \times 10^{-8}$ Ω·m).

Comparative Example 8 is identical to Example 4 except that the material of the holder was zirconium (specific electric resistance is $35 \times 10^{-8}$ Ω·m).

Measurement of Defectively Transferred Positions

The slave mediums undergone magnetic transfer were developed by diluting a magnetic developing solution (Sigmarker Q produced by Sigma Hi-Chemical Inc.) ten times, dropping it onto the slave mediums, and then drying it, and developed signals were visually observed. If no signal omission was seen, it was evaluated as excellent ( ), if signal omission was seen in 1 to 5 places, and if signal omission was seen in six or more places, it was evaluated as bad (x). The results are shown in Table 1, Table 2 and Table 3.

Method for Evaluating the Quality of Signals

The transferred signals of the slave medium were evaluated by means of an apparatus for measuring electromagnet conversion property (SS-60 produced by Kyodo Denshi System Co. Ltd.). Used as a head was a MR head with a read head gap of 0.29 μm, a read track width of 1.2 μm, a write head gap of 0.5 μm and a write track width of 1.8 μm. The read-out signal was frequency-divided by a spectrum-analyzer and difference C/N between the peak intensity C of the first signal and narrow band noise N was measured. Recordation and reproduction were also performed using the same head in a conventional method. The calculated C/N value was regarded as 0 dB and evaluation was performed with the relative value (ΔC/N). If reproduction C/N value was −0.3 dB or more, it was evaluated as excellent ( ), and if it was less than −0.3 dB, it was evaluated as bad (x). The results are shown in Table 1 and Table 2.

TABLE 1

|  | Thickness of Holder (mm) | Flexural Rigidity (kN · m²) | Signal Omission | Evaluation | Signal Quality | Evaluation | Synthetic Evaluation |
|---|---|---|---|---|---|---|---|
| Example 1 | 5 | 0.74 | 0 | ○ | −0.1 | ○ | ○ |
| Example 2 | 3 | 0.16 | 0 | ○ | 0.1 | ○ | ○ |
| Example 3 | 15 | 20.11 | 0 | ○ | −0.2 | ○ | ○ |
| Comparative Example 1 | 2 | 0.05 | 12 | x | −0.2 | ○ | x |
| Comparative Example 2 | 45 | 542.95 | 0 | ○ | −0.9 | x | x |
| Comparative Example 3 | 5 | 0.74 | 39 | x | −0.4 | x | x |
| Comparative Example 4 | 5 | 0.74 | 18 | x | −0.3 | ○ | x |

TABLE 2

|  | Relative Magnetic Permeability | Signal Quality | Evaluation |
|---|---|---|---|
| Example 4 | 0.8 | 0.1 | ○ |
| Example 5 | 2 | 0 | ○ |
| Example 6 | 8 | −0.1 | ○ |
| Comparative Example 5 | 15 | −0.4 | x |
| Comparative Example 6 | 30 | −0.6 | x |

TABLE 3

|  | Relative Magnetic Permeability | Signal Omission | Evaluation | Signal Quality | Evaluation | Synthetic Evaluation |
|---|---|---|---|---|---|---|
| Example 7 | 0.8 | 0 | ○ | −0.1 | ○ | ○ |
| Example 8 | 2 | 0 | ○ | 0.1 | ○ | ○ |
| Comparative Example 7 | 15 | 0 | ○ | −0.4 | x | x |
| Comparative Example 8 | 30 | 2 | x | −0.1 | ○ | x |

What is claimed is:

1. A magnetic transfer apparatus for executing magnetic transfer by applying transfer magnetic field after a master carrier bearing transfer information and a slave medium to be transferred are brought into confronted close contact and received within a holder, characterized in that the relative magnetic permeability μ of material of said holder is not more than 10.

2. A magnetic transfer apparatus for executing magnetic transfer by applying transfer magnetic field after a master carrier bearing transfer information and a slave medium to be transferred are brought into confronted close contact and received within a holder, characterized in that the surface of said holder is treated with surface hardening treatment.

* * * * *